United States Patent [19]

Bennett et al.

[11] 4,130,750
[45] Dec. 19, 1978

[54] MACHINE FOR WELDING ALUMINUM TO ALUMINUM

[75] Inventors: Moreland P. Bennett, Hickory, N.C.; William L. Bowers, Shreveport, La.

[73] Assignee: General Electric Company, Philadelphia, Pa.

[21] Appl. No.: 700,609

[22] Filed: Jun. 28, 1976

Related U.S. Application Data

[62] Division of Ser. No. 638,300, Dec. 8, 1975, Pat. No. 4,048,463.

[51] Int. Cl.² .............................................. B23K 11/16
[52] U.S. Cl. ................................. 219/78.15; 219/86.1; 219/87; 219/118; 219/119; 219/161
[58] Field of Search .................... 219/79, 86, 87, 92, 219/118, 119, 120, 161, 78.15, 86.1; 228/5.1, 13

[56] References Cited

U.S. PATENT DOCUMENTS

| 2,580,398 | 1/1952 | Braswell | 219/86 X |
|---|---|---|---|
| 2,795,688 | 6/1957 | McCaffrey, Sr. | 219/118 X |
| 3,067,319 | 12/1962 | Zamboldi et al. | 219/118 X |
| 3,296,409 | 1/1967 | Schwartz | 219/87 |
| 3,509,307 | 4/1970 | Gannoe | 219/79 |
| 3,665,145 | 5/1972 | Engel | 219/119 |

*Primary Examiner*—Elliot A. Goldberg
*Attorney, Agent, or Firm*—William Freedman; Francis X. Doyle

[57] ABSTRACT

A method of welding aluminum to aluminum by thermal resistance welding, providing good electrical and mechanical characteristics. The method uses special electrodes for thermal heat that are hard and have a high electrical resistance, such as molybdenum or tungsten alloy and also relies on the aluminum oxide coating on the aluminum to provide the desired resistance heating of the aluminum to cause welding of the aluminum material. The machine disclosed provides a means for securing aluminum leads to the start and finish end of an aluminum winding automatically and simultaneously.

3 Claims, 4 Drawing Figures

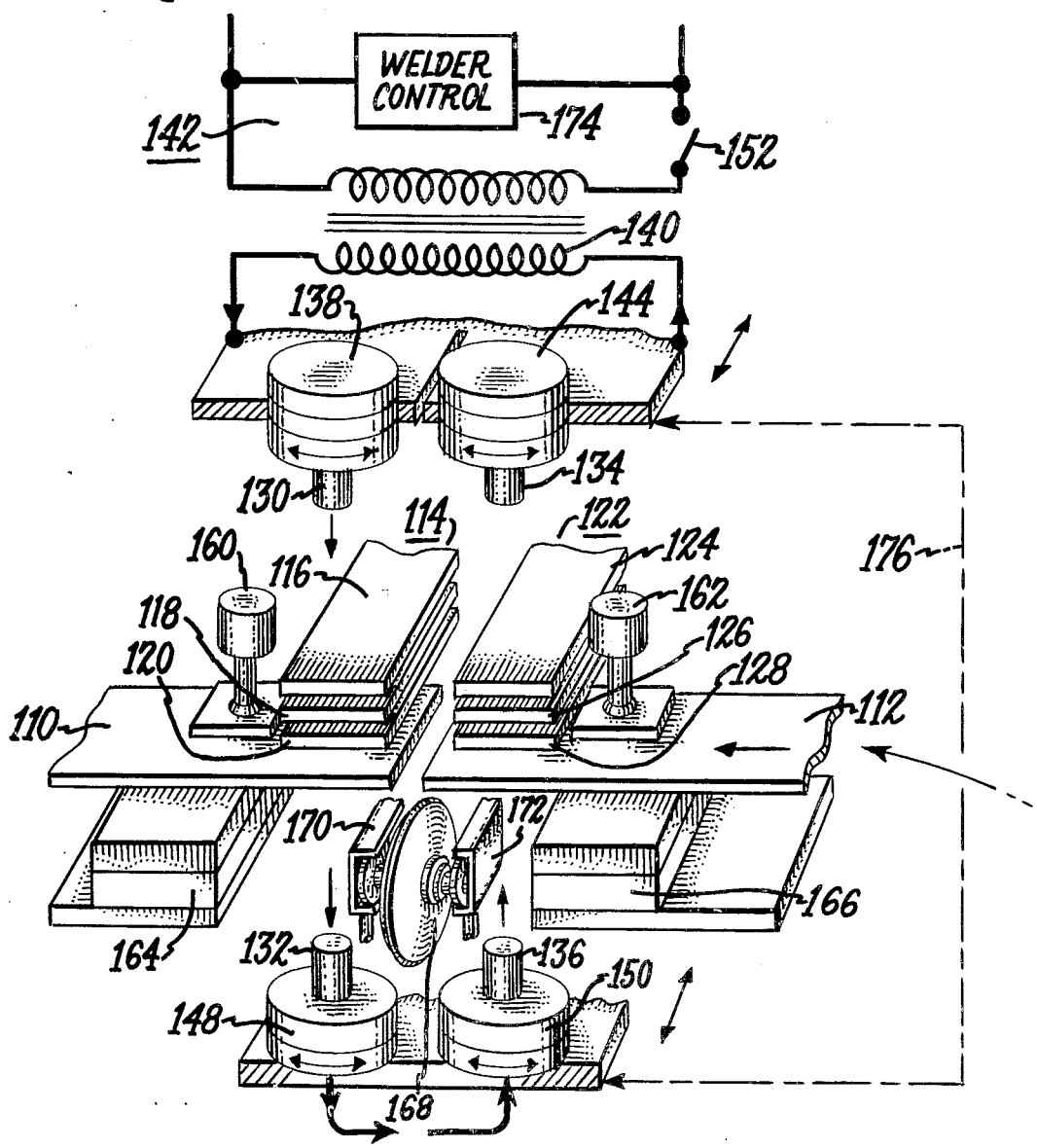

MACHINE FOR WELDING ALUMINUM TO ALUMINUM

This is a division, of application Ser. No. 638,300, filed Dec. 8, 1975 now U.S. Pat. No. 4,048,463.

BACKGROUND OF THE INVENTION

This invention relates to a method of bonding at least two aluminum members and to a machine for practicing such method.

In the electrical apparatus field the use of aluminum strip material to form coils has become widely used throughout the industry. In the manufacture of coils, it is necessary to attach terminal and lead members to one or more portions of the aluminum strip. Where such terminals are aluminum material, it is necessary to provide a strong electrical joint between the aluminum members.

In general, the bonding of one aluminum member to another by resistance welding has been found unsatisfactory. The inability to obtain a consistently strong, uniform joint of good electrical characteristics has been often noted during the welding of aluminum to aluminum.

One method that has been used successfully is disclosed in U.S. Pat. No. 3,592,993, in the name of one of the inventors herein. However, that method requires the addition of a copper or copper alloy screen between the members to be joined. It is considered desirable to provide a method of resistance welding which does not require the use of any additional material to the joint.

It has been found that a consistently strong, electricallysound joint can be made between an aluminum lead and an aluminum winding by using hard, high-electrical resistance electrodes and relying on the oxide coating of the aluminum to provide resistance heating to spot weld the aluminum members together.

Therefore, it is one object of this invention to provide a novel method of joining aluminum to aluminum. It is a further object of this invention to provide a novel method of joining aluminum members which does not require cleaning of the aluminum surfaces, but relies on the aluminum oxide coating to provide resistance heating to aid in welding the aluminum members.

A still further object of this invention is to provide a novel machine for thermal resistance welding of aluminum members.

SUMMARY OF THE INVENTION

Briefly, in one form, this invention comprises a method of joining at least two aluminum members together in which the mating surfaces of the aluminum members are not cleaned. Thermal heat and pressure are applied from hard high-electrical resistance electrodes and resistance heat is provided by the oxide coating on the aluminum, both on the surfaces against the electrodes and the mating surfaces, to bond the mating aluminum surfaces together. The invention also comprises a novel machine for carrying out this method.

The invention sought to be protected will be particularly pointed out and distinctly claimed in the claims appended hereto. However, it is believed that this invention and the manner in which its objects and advantages are obtained, as well as other objects and advantages thereof, will be better understood by reference to the following detailed description of the preferred embodiment of both the method and the machine, particularly when considered in the light of the accompanying drawings.

BRIEF DESCRIPTION OF DRAWINGS

FIG. 3 is a perspective view of a series of spot welds between an aluminum strip and an aluminum lead, formed of a plurality of aluminum members, made by the method of this invention;

FIG. 4 is a schematic, perspective view of a preferred machine for automatically carrying out the method of this invention.

DESCRIPTION OF PREFERRED EMBODIMENT OF THE METHOD

As before mentioned, it has been discovered that a strong mechanical bond having good electrical characteristics can be formed between at least two aluminum members in which the aluminum surfaces to be joined are not cleaned. Thermal heat and pressure are applied to the joint by hard high-electrical resistance electrodes and resistance heat is provided by the oxide coating on the aluminum to form a firm bond mating the aluminum surfaces together.

Figure 1:
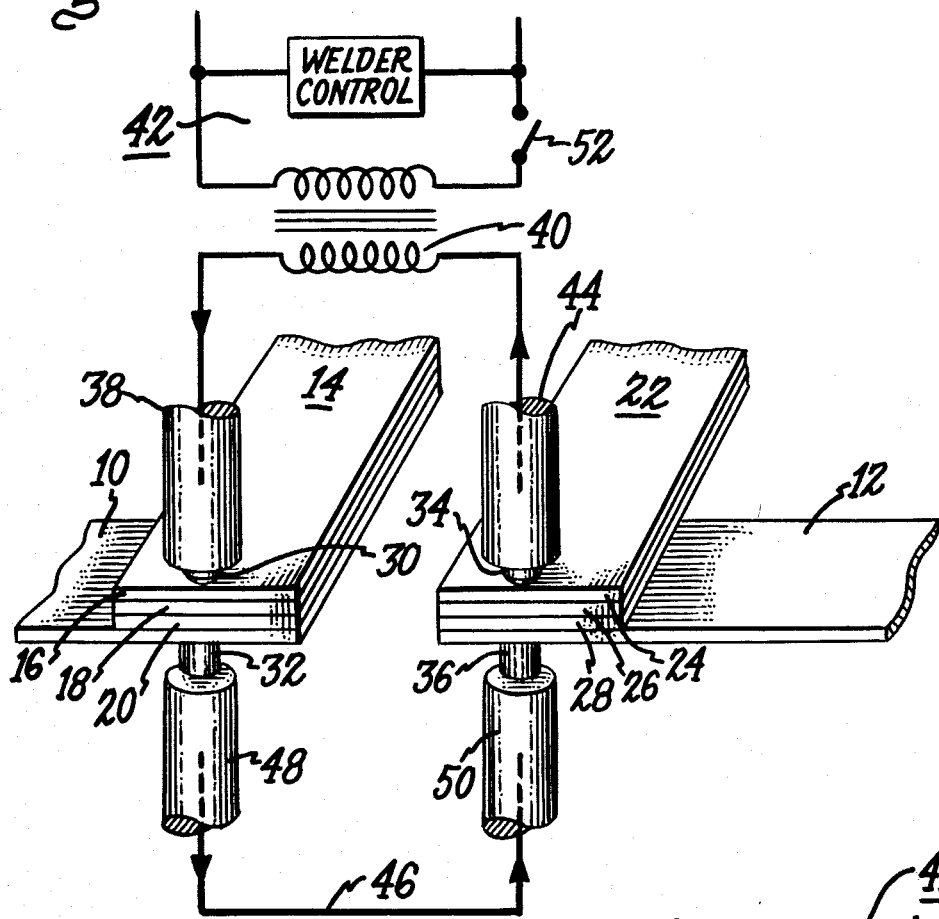
FIG. 1 is a schematic, perspective view of the preferred method of welding according to this invention.
Figure 2:
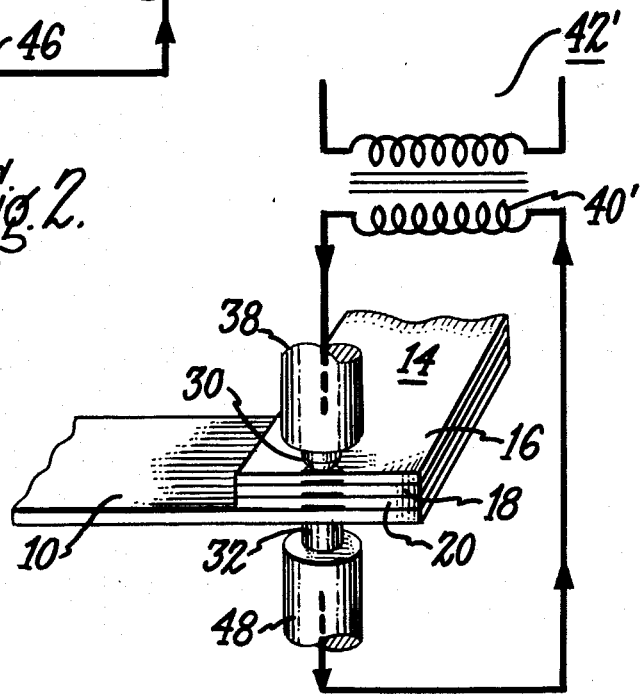
FIG. 2 is a schematic perspective view of the method of this invention similar to FIG. 1, but showing only the use of two electrodes.

Reference will now be made to the drawings in which like numerals are used to indicate like parts throughout the various views and particularly to FIGS. 1 through 3 for a more complete description of the novel method of this invention. FIG. 1 discloses a schematic, perspective view of a preferred form of the method of this invention in which aluminum leads are joined to the start and the finish end of an aluminum strip, which is in the form of an electrical coil. FIG. 2 shows the method as applied to welding a single aluminum lead, formed of a plurality of aluminum members, to an aluminum strip, which may be the start or the finish end of an aluminum wound coil. FIG. 3 is used to show the formation of a plurality of spot welds across the joint formed between the aluminum lead and the aluminum strip.

In FIG. 1 an aluminum strip 10, which may be the finish end of a wound coil, and aluminum strip 12, which may be the start end of another coil, are shown. An aluminum lead 14, formed of a plurality of aluminum members, such as 16, 18, and 20, is to be joined to aluminum strip 10, while aluminum lead 22, formed by a plurality of members, such as 24, 26, and 28, to to be joined to aluminum strip 12. In the method of this invention, contrary to prior teachings, the aluminum surfaces to be joined are not cleaned, the oxide coating on the surfaces is used to provide resistance heating of the aluminum. As shown, the plurality of members of lead 14 are placed one on top of each other and the lower lead member 20 is placed in contact with aluminum strip 10. In a similar fashion, aluminum lead 22 has its members stacked together, with bottom member 28 contacting aluminum strip 12. As will be understood, if aluminum strips 10 and 12 are continuous, it will be necessary to sever the strips, as shown, before welding.

Special welding electrodes are used in the method of this invention which are hard, and of high-electrical resistance. For example, a tungsten alloy has been used having a hardness of 24 - 28 RC and electrical conductivity of 13 - 16 percent of copper. Molybdenum has also been used as electrodes. These electrodes provide excellent thermal heating characteristics to the weld. In FIG. 1, electrodes 30 and 32, made of molybdenum or tungsten alloy or similar material, are shown contacting lead 14 and strip 10 respectively, while similar material electrodes 34 and 36 are shown contacting leads 22 and strip 12 respectively. As shown, electrode 30 is connected, through electrode holder and air cylinder 38 to one side of secondary 40 of a conventional welder 42. Electrode 34 is connected through electrode holder and air cylinder 44 to the other side of secondary 40. Electrodes 32 and 36 are connected in series, as indicated by lead 46, to holders and air cylinders 48 and 50, as shown. As will be understood, air cylinders 38, 48, and 44, 50 provide pressure to the electrodes 30, 32 and 34, 36 respectively, forcing the leads 14 and strip 10 and lead 22 and strip 12 into firm contact. Welding current from the secondary 40 is caused to flow when switch 52 of the welder 42 is closed. Due to the high-resistance electrodes and the oxide coating on the surface of the aluminum material, only approximately 50 percent of the normal primary and secondary current are necessary for making welds according to this invention.

FIG. 2 shows the method of this invention applied to welding one aluminum lead 14 with members 16, 18 and 20 to a single aluminum strip 10. The same type of electrodes 30, 32, are used, connected to the secondary 40' of a conventional welder 42'. Of course, it will be apparent, that while leads are shown having a plurality of members, only a single member lead could be used. Also, if desired, the aluminum strip 10 could be sandwiched between the members of lead 14, if desired.

FIG. 3 shows the results of the method of this invention in which three spot welds 54, 56 and 58 are provided between aluminum lead 14 and aluminum strip 10. The spacing of the spot is not critical, nor is the size of the spot weld. However, tests have indicated that the minimum weld slug diameter should be 0.125 inches. The start and finish spots, i.e., 54 and 58 in FIG. 3 should be approximately 0.6 inches from the edge of the stip, while the spot welds should be spaced approximately 0.8 inches from each other.

The following indicates the application of the method of this invention as used to join various sizes of uncleaned aluminum leads to various sizes of uncleaned aluminum strips.

1. 0.074 inch thick aluminum strip to two 0.060 inch aluminum leads. This connection was made with a 500 pound electrode force with 23 cycles of welding time. 24,000 amperes of secondary current was utilized from a primary current of 1,100 amperes.

2. 0.051 inch thick aluminum strip joined to two 0.060 inch aluminum leads. 500 pounds electrode force was used with 20 cycles welding time. 20,000 amperes secondary current was utilized from 950 amperes of primary current.

3. 0.044 inch aluminum strip welded to two 0.060 inch aluminum leads. Again 500 pounds electrode force was used with 20 cycles of welding time. 20,000 amperes of secondary current was utilized with 950 amperes of primary current.

4. A 0.036 inch of aluminum strip was welded to two 0.060 inch aluminum leads. 500 pounds of electrode force was utilized together with 17 cycles of weld time. The current utilized was 20,000 secondary amperes and 950 primary amperes.

5. A 0.068 inch aluminum strip was joined to one 0.060 inch aluminum lead. 500 pounds of electrode force was utilized together with 17 cycles of welding time. 16,000 amperes secondary current was used with 800 primary amperes.

In all the above welds molybdenum electrodes were utilized.

It is believed that the above examples clearly show that the method of this invention which utilizes the oxide on the aluminum strip together with the hard, high-resistance electrodes provide a novel method of welding aluminum to aluminum utilizing approximately one-half the current which is normally utilized for making aluminum welds. While the hardness of the electrodes is not critical, it has been found that a Rockwell hardness of from 90B to 40C is adequate for the purpose of this invention. The resistance of the electrodes is also not critical. However, best results are obtained when the electrode material has an electrical conductivity of approximately 10 to 35 percent of copper.

DESCRIPTION OF PREFERRED EMBODIMENT OF MACHINE

FIG. 4 shows a novel machine for carrying out the method of this invention. The machine disclosed in FIG. 4 is especially designed for use in production line for making aluminum coils and securing start and finish aluminum leads to such coils. In order to clearly relate the machine of FIG. 4 to the method described in FIG. 1, the same numerals will be used, preceded by 100. Referring to FIG. 4, aluminum strip 110, the finished end of a wound coil, and aluminum strip 112, the start end of another coil, are shown. An aluminum lead 114, formed of a plurality of aluminum members, such as 116, 118, and 120, is to be joined to the aluminum strip 110, while aluminum lead 122, formed of a plurality of members 124, 126, and 128 is to be joined to aluminum strip 112. As previously explained, the surfaces of the various aluminum members are not cleaned. The various lead members 116, 118, and 120, are stacked together and placed in contact with aluminum strip 110, while lead members 124, 126, and 128 are stacked together and placed in contact with aluminum strip 112, as shown. In normal production, aluminum strip 110 and 112 are continuous, and will be separated, as will be described.

When the machine is actuated, clamps 160 and 162 clamp the strip 110, 112 to table members 164 and 166 respectively, as shown. Clamps 160, 162 are preferably actuated by air cylinders. After clamping, roller cutter 168, rolling in tracks 170, 172, severes strip 110, 112 as shown. Roll cutter 168 may be actuated as desired. In the preferred embodiment an air cylinder is used. After the strip 110, 112 is severed, special electrodes, as previously described, 130, 132 and 134, 136 are actuated by combined electrode holders and air cylinders 138, 148 and 144, 150 to clamp lead 114 to strip 110 and lead 122 to strip 112, respectively. Automatic welding control 174 is then actuated, for example, by closing switch 152, causing welder 142 to pulse secondary 140 with the desired cycles of current to form a spot weld between lead 114 and strip 110 and lead 122 and strip 112, such as is shown in FIG. 3. Upon completion of the spot welds, the electrodes 130, 132 and 134, 136 are twisted by combined electrode holders and air cylinders 138, 148 and 144, 150 respectively, to unstick them from the aluminum members, should this be necessary. The electrodes are then indexed, as desired, by any well-known means, as is indicated by dotted line 176, to the next spot weld location. This procedure is continued until sufficient spot welds are provided between lead 114 and strip 110 and lead 122 and strip 112 to provide the desired mechanical and electrical connection. Of course, it will be apparent that the spot welds (shown in FIG. 3) can be in either a straight line or staggered, as desired.

Upon completion of the spot welds, the electrodes 130, 132, 134, and 136, are released, allowing strip 110 and its lead 114 to be wound into the coil. This also frees strip 112 and its lead 122 to be used in another coil. Of course, it will be apparent to those skilled in this art that the machine of FIG. 4 could be used to weld a single lead to an end of a winding or coil. With such use, only one pair of electrodes would be necessary.

While there has been shown and described the present preferred embodiment of the method and the preferred machine for carrying out such method, it will be apparent to those skilled in this art that various modifications may be made. For example, oil may be used between the electrodes and the aluminum surfaces to prevent sticking between the electrodes and the aluminum surfaces, if this should be desired. Of course, as will be apparent from the previous description, the welding current as well as the welding cycles will depend upon the thickness of the aluminum strips and the thickness and number of aluminum leads to be joined to the aluminum strip. It will, of course, be apparent to those skilled in the art, that these and other changes may be made without departing from the spirit and scope of the invention as is defined in the appended claims.

What is claimed as new and which it is desired to secure by Letters Patent of the United States is:

1. A machine for welding a pair of aluminum leads to an aluminum coil comprising two pairs of opposed electrodes made of hard, high-electrical resistance material mounted in holders, said electrodes being formed of a material selected from the group consisting of molybdenum, tungsten, and alloys thereof, means for moving each said pair of opposed electrodes toward and away from each other, means for connecting one electrode of each said pair to the secondary of a welding transformer, means connecting the other electrode of each said pair in electrical series circuit, means for mounting a portion of an aluminum coil between the opposed electrodes of each said pair, and means for severing said portion of said aluminum coil between said pairs of opposed electrodes.

2. A machine for welding a pair of aluminum leads to an aluminum coil as set forth in claim 1 in which clamping means are provided to clamp said portion of said coil to said machine prior to severing said coil portion.

3. A machine for welding a pair of aluminum leads to an aluminum coil as set forth in claim 1 in which said electrode holders are provided with means for twisting said electrodes to prevent sticking of said electrodes to the aluminum weld members.

* * * * *